US009211953B2

(12) United States Patent
Paul (10) Patent No.: US 9,211,953 B2
(45) Date of Patent: Dec. 15, 2015

(54) EQUIPMENT MODULE FOR A VEHICLE AND VEHICLE WITH A VEHICLE BODY COMPRISING A CARGO SPACE

(75) Inventor: Carsten Paul, Garstedt (DE)

(73) Assignee: Airbus Operations GmbH (DE)

( * ) Notice: Subject to any disclaimer, the term of this patent is extended or adjusted under 35 U.S.C. 154(b) by 817 days.

(21) Appl. No.: 13/446,090

(22) Filed: Apr. 13, 2012

(65) Prior Publication Data

US 2012/0261981 A1    Oct. 18, 2012

Related U.S. Application Data

(60) Provisional application No. 61/475,790, filed on Apr. 15, 2011.

(30) Foreign Application Priority Data

Apr. 15, 2011    (DE) .......................... 10 2011 017 164

(51) Int. Cl.
*H02J 7/00*    (2006.01)
*H02J 17/00*    (2006.01)
*B64D 11/06*    (2006.01)
(Continued)

(52) U.S. Cl.
CPC  *B64D 11/06* (2013.01); *B64D 9/00* (2013.01); *B64D 11/00* (2013.01); *B64D 11/0624* (2013.01); *B64D 11/0696* (2013.01)

(58) Field of Classification Search
CPC .... B64D 11/00; B64D 11/06; B64D 11/0624; B64D 11/0696; B64D 9/00
USPC .......................................... 320/108; 307/104
See application file for complete search history.

(56) References Cited

U.S. PATENT DOCUMENTS 2,908,766 A * 10/1959 Taylor ............................ 381/79
3,142,461 A    7/1964 Naylor
(Continued)

FOREIGN PATENT DOCUMENTS

DE    19743313 C1    12/1998
DE    10102995 A1    8/2002
(Continued)

OTHER PUBLICATIONS

Extended European Search Report for Application No. 12164148.4 dated Sep. 23, 2015.

*Primary Examiner* — Jared Fureman
*Assistant Examiner* — Emmanuel R Dominique
(74) *Attorney, Agent, or Firm* — Lerner, David, Littenberg, Krumholz & Mentlik, LLP (57) ABSTRACT

An equipment module for a vehicle comprises a floor element, at least one first inductive coupling element and at least one electronics unit. The floor element comprises at least one attachment means, which can be reached from the top, for attaching items of equipment, and on the underside at least one retaining means for attaching the floor element at a positioning space in a vehicle. The first inductive coupling element is arranged on the floor element and is connected to at least one electronics unit. The electronics unit is adapted for providing an identification signal by way of the first inductive coupling element, which identification signal makes it possible to identify the equipment module. The invention makes it possible to quickly reconfigure a cabin of a vehicle, and makes it possible for the vehicle to quickly identify all the reconfigurable installations for adapting items of equipment on the vehicle side.

15 Claims, 4 Drawing Sheets

(51) Int. Cl.
*B64D 9/00* (2006.01)
*B64D 11/00* (2006.01)

(56) References Cited

U.S. PATENT DOCUMENTS

| | | | |
|---|---|---|---|
| 3,381,921 A | 5/1968 | McDonough | |
| 3,578,274 A | 5/1971 | Ginn et al. | |
| 4,428,078 A * | 1/1984 | Kuo | 455/3.06 |
| 4,647,980 A * | 3/1987 | Steventon et al. | 348/837 |
| 4,736,452 A * | 4/1988 | Daniels et al. | 455/41.1 |
| 4,833,337 A | 5/1989 | Kelley et al. | |
| 4,835,604 A * | 5/1989 | Kondo et al. | 725/76 |
| 5,006,973 A * | 4/1991 | Turner | 363/34 |
| 6,222,443 B1 | 4/2001 | Beeson et al. | |
| 8,482,158 B2 * | 7/2013 | Kurs et al. | 307/104 |
| 8,902,057 B2 * | 12/2014 | Strutz et al. | 340/457.1 |
| 2005/0217903 A1 * | 10/2005 | Roberts et al. | 177/245 |
| 2006/0214057 A1 | 9/2006 | Saint-Jalmes et al. | |
| 2007/0025832 A1 * | 2/2007 | Rawdon et al. | 414/401 |
| 2009/0224723 A1 * | 9/2009 | Tanabe | 320/108 |
| 2010/0117438 A1 * | 5/2010 | Takao et al. | 297/475 |
| 2011/0043163 A1 * | 2/2011 | Baarman | 320/108 |
| 2013/0038135 A1 * | 2/2013 | Ichikawa | 307/104 |
| 2013/0342023 A1 * | 12/2013 | Li et al. | 307/104 |

FOREIGN PATENT DOCUMENTS

| | | |
|---|---|---|
| DE | 10103280 A1 | 8/2002 |
| DE | 10161898 A1 | 4/2003 |
| DE | 10258837 B3 | 4/2004 |
| DE | 10347561 B3 | 1/2005 |
| DE | 602006000901 T2 | 6/2009 |
| DE | 102008024217 A1 | 12/2009 |
| DE | 102009008187 A1 | 8/2010 |
| EP | 0862524 A1 | 9/1998 |
| EP | 2109059 A1 | 10/2009 |
| WO | 9720710 A1 | 6/1997 |

* cited by examiner

EQUIPMENT MODULE FOR A VEHICLE AND VEHICLE WITH A VEHICLE BODY COMPRISING A CARGO SPACE

CROSS-REFERENCE TO RELATED APPLICATIONS

This application claims the benefit of the filing date of U.S. Provisional Patent Application No. 61/475,790 filed Apr. 15, 2011, the disclosure of which is hereby incorporated herein by reference.

TECHNICAL FIELD

The invention relates to an equipment module for a vehicle and a vehicle with a vehicle body comprising a cargo space.

BACKGROUND TO THE INVENTION

Vehicles used to transport a sizeable number of passengers, for example aircraft, ships or boats, are frequently equipped, according to individual wishes of the vehicle operator, with passenger seats and equipment that ensure passenger wellbeing on board the vehicle. The economic efficiency of such a vehicle can be improved if a degree of modularity and flexibility in terms of equipment is implemented. To this effect attachment systems are used by means of which passenger seats or cabin monuments can be attached at individual positions within a vehicle cabin. In an aircraft such an attachment system comprises seat rails and mounting devices that can be inserted in said seat rails. The seat rails are arranged on or in a cabin floor and comprise a number of spaced-apart indentations or recesses with which the mounting devices can establish click-on connections. In this arrangement, reconfiguring an aircraft cabin requires deinstallation and reinstallation of passenger seats and other cabin equipment components at the predetermined positions. Such an approach is relatively time consuming because all the passenger seats need to be brought manually from one position to another position, and in the case of modern passenger seats in addition need to be supplied with electrical power and data connection devices. Overall, frequent necessity for reconfiguration, which is associated with vehicle downtime, can have a negative effect on the economic efficiency of the vehicle.

Simplification of the establishment of electrical connections by means of inductive coupling elements in a vehicle floor and passenger seats arranged thereon is proposed in DE 10 2008 024 217 A1.

BRIEF SUMMARY OF THE INVENTION

Described herein are an equipment module for a vehicle, and a vehicle comprising an equipment module that allows the fastest possible reconfigurability of a vehicle, wherein at the same time neither the usual passenger comfort nor necessary safety are to be dispensed with.

The vehicle comprises a vehicle body and at least one equipment module. The equipment module according to an embodiment of the invention comprises a floor element with at least one attachment means, accessible from the top for attaching items of equipment, with at least one first inductive coupling element for transmitting electrical power and/or data and with at least one electronics unit, wherein the first inductive coupling element is arranged on the floor element and is connected to at least one electronics unit of the equipment module. The vehicle according to an embodiment of the invention comprises at least one vehicle space arranged in the vehicle body, having at least one floor area, at least one retaining means arranged on the floor area and a grid of a plurality of second inductive coupling elements, wherein the second inductive coupling elements are connected to at least one electronics unit of the vehicle. The dimensions of the floor element correspond to the grid of the plurality of second inductive coupling elements. Furthermore, the electronics unit of the equipment module is adapted for providing an identification signal by way of the first inductive coupling element, which identification signal makes it possible to identify the equipment module.

An aspect of an equipment module designed in this manner consists of providing a self-contained, independent, floor element that can hold a host of different items of equipment by means of the at least one attachment means so that depending on requirements an individual equipment module can be composed outside the vehicle concerned, which equipment module can then be placed into the vehicle and attached therein. This speeds up, in particular, reconfiguration of a vehicle, because it no longer involves extended downtimes. Practically no conversion work directly within the vehicle is necessary, even if the configuration of the vehicle is fundamentally changed by exchanging equipment modules.

Preferably, the electronics unit of the equipment module is adapted for providing an identification signal by way of the first inductive coupling element, which identification signal makes it possible to identify the equipment module. One requirement of a modern vehicle providing a degree of flexibility can consist of being aware of the number and positions of items of equipment in a vehicle cabin. This is relevant, in particular, in the design of the vehicle as an aircraft, because for calculating fuel consumption, for favorably adjusting the center of gravity, and for controlling modern cabin systems with variable-position display units or the like, the respective locations of passenger seats are relevant.

A flexible design, according to an embodiment of the invention, of a floor element in the form of an equipment module can also be used to equip a cargo space of a vehicle in an entirely modular manner.

A space, e.g. a cargo space, of an aircraft or of some other vehicle type, which space is equipped with roller conveyors, guide rails or other guide means distributed on the floor for guiding equipment modules according to an embodiment of the invention or containers, comprises locking means or retaining means that make it possible to mount an equipment module as explained above or to mount a cargo container. In order to identify the respective inserted equipment module, furthermore, the space can be designed in such a manner that on various positions, which should all fit into an implemented grid of floor elements of desired dimensions, second inductive coupling elements are arranged. These are designed, by directly adjacent positioning, or by positioning one directly on top of the other, to form a transducer with the first inductive coupling elements of the equipment module according to the invention, by means of which transducer electrical signal transmission can be initiated. This technique also makes it possible to transmit electrical power and data streams to passenger seats to supply electrical and electronic devices at the passenger seats, for example the playback of media data for entertainment, the operation of electrical adjustment units or the like. This is described in detail in DE 10 2008 024 217 A1.

When sliding an equipment module according to an embodiment of the invention into a cargo space or into an "empty" passenger cabin of a vehicle, individual use of the corresponding room can thus be achieved, wherein at the same time, by way of the provided identification data of the equipment module, immediately after installation of said equipment module the vehicle becomes aware of the type of the equipment module and can provide correspondingly adapted features. Without any claims to comprehensiveness, these features can comprise the provision of air conditioning, lighting or ventilation functions, electrical power, data streams and the like.

The term "floor element" of the equipment module can refer to any spatially delimited surface-like element that makes it possible to receive an attachment means and to position items of equipment. Depending on the opening that can be made available in the vehicle space in question, and depending on available service vehicles and personnel, a floor element comprises a certain maximum size so that said floor element with the items of equipment arranged thereon can be moved into the vehicle space without any problems. For example, the term "floor element" can refer to a suitable pallet or freight pallet that comprises a certain strength and rigidity. In this context it should be pointed out that the underside of the floor element according to an embodiment of the invention comprises guide devices that correspond to guide means located in the vehicle, and consequently precise guiding and positioning of the equipment modules can take place. This can, for example, comprise recesses or projections that can enter a connection over a large area with the guide means, and, particularly preferably, are also designed in such a manner that automated displacement to predetermined positions, for example by means of electrically operable rollers of a roller conveyor, is made possible.

Furthermore, it should be mentioned that with the use of first and second inductive coupling elements it is at all times possible to detect whether a load in the form of a cargo container or of an equipment module has worked itself loose. Thus, improved monitoring or checking the load becomes possible, and safety on board the aircraft can be enhanced. With the use of inductive coupling elements it is particularly easy to supply electrical power and data to entirely different types of electrical consumers on the floor element, and consequently no conversion work on the vehicle becomes necessary. This results in particularly fast reconfiguration of passenger seats to cargo containers and vice-versa, provided the vehicle has a cargo space of adequate size.

It should be pointed out that, in the field of aviation, seats that are attached to freight pallets are known in principle, but their use is predominantly restricted to military applications without the need to supply electrical power or data for in-flight entertainment systems to the seats.

Overall, the proposed design of a vehicle can thus comprise one or several vehicle spaces that can be equipped with at least one equipment module as described above. This makes it possible to achieve completely modular and particularly quick reconfiguration of a vehicle space, wherein the vehicle space in question can be designed not only in the form of a passenger cabin with an originally empty floor area, but also in the form of a cargo space. The retaining means in the floor area of the vehicle space should be suitable to completely and securely lock the floor area of the vehicle space so that during normal operation of the vehicle adequately secure mounting is allowed, wherein in this respect different prerequisites have to be met depending on the type of vehicle. In the example of a passenger aircraft the retaining means needs, for example, to be able to withstand accelerations of 16 g, and thus needs to be designed accordingly. The retaining means may be designed in the form of commonly-used pivotally held rollers with a hook-shaped end, which rollers laterally engage a floor area, or if required are countersunk in the floor of the cargo space so that they do not act against any displacement of cargo containers or equipment modules. Preferably, the electronics unit of the vehicle is equipped, with the use of first and second inductive coupling elements, to detect whether a load in the form of a cargo container or of an equipment module has worked itself loose. Thus, improved monitoring or checking the load becomes possible, and safety on board the aircraft can be enhanced. This can take place by measuring oscillation behavior, a resistance or a transmitted electrical current.

For enabling an improved flexibility, second inductive coupling elements are arranged in a grid on the floor area. Thereby, a plurality of possible positions are provided for attaching one or more equipment modules in the space. Within the grid measures, a plurality of different floor element sizes are possible that e.g. allow the use of larger and smaller floor elements and thus equipment modules.

In an advantageous embodiment of the invention, the first inductive coupling element is arranged on the top of the floor element, wherein the position of the inductive coupling element is in a region located in or beside a region above the at least one attachment means. Consequently, damage to the first inductive coupling element is prevented, because during the insertion, positioning, locking, undoing and removal of the equipment module according to an embodiment of the invention it is always only the underside of the equipment module that is subjected to mechanical loads. If the inductive coupling element is not present in that region it is not subjected to mechanical stress. Transmitting or electrically conducting signals, data, or electricity through the floor element is unproblematic with suitable dimensioning of the coils used. In particular in aircraft the floor element is designed so as to be particularly weight saving; it comprises, for example, a sandwich structure with at least one core layer and one or several covering layers.

In an advantageous embodiment of the invention the equipment module according to an embodiment of the invention comprises a distributor unit that is connected to the first inductive coupling element and that is adapted for adjusting a voltage induced into the first inductive coupling element to a predetermined voltage value and/or to a predetermined frequency, and to provide the aforesaid on at least one voltage output. Electrical consumers that are located on or in the equipment module according to the invention thus need only be connected to the distributor unit in order to be able to provide electrical functions. Individual transformation of a voltage is not required.

Preferably, the distributor unit is adapted for extracting an oscillation signal ("Oberschwingung") from a voltage induced by a second inductive coupling element into the first inductive coupling element, and to provide the oscillation signal, by way of a signal converter, as binary data to at least one data interface. In this arrangement data transmission can take place in a manner similar to that clearly described in DE 10 2008 024 217 A1. For this purpose the distributor unit comprises a signal input that is connected to the first inductive coupling element. The distributor unit is designed, from the frequency-modulated alternating voltage present at the signal input, which alternating voltage is induced into the first inductive coupling element, to demodulate data and provide it at the data interface. Preferably, in parallel to this, the provision of a voltage for electrical consumers, and the provision of data for data-consuming devices, for example display units for an in-flight entertainment system or similar, take place.

In an advantageous embodiment the distributor unit and/or the electronics unit are/is adapted for modulating data arriving at the data interface to form an oscillation signal that can be transmitted by way of the first inductive coupling element so that the provision or transmission of data to correspondingly-positioned second inductive coupling elements is made possible.

In a preferred embodiment of the invention the first inductive coupling element is integrated so as to be flush with a floor panel of the floor element. Consequently, the upwards-facing active side should comprise a particularly planar or smooth surface without any steps, projections or indentations in the regions of the arranged first inductive coupling elements. This makes possible a uniform design of the surface of the floor element, as well as minimum possible influencing of the first inductive coupling element during conversion work or modification work. The flush arrangement can be achieved by complete integration of a first inductive coupling element into a floor panel arranged on the surface of the floor element, by an arrangement on the underside of the floor panel, by an arrangement on a stiffening element of the floor element, or by an arrangement on retaining means.

In an advantageous embodiment the equipment module according to an embodiment of the invention is adapted for sending out weight data. The weight data comprises, in particular, the total weight of the equipment module in question and optionally also the position of the center of gravity. The weight data can be acquired by one or several weighing devices that are arranged in the equipment module on retaining means or the like.

In particular, the use in an aircraft thus makes it possible, in this manner, already at the time of insertion of the equipment module or at the time of loading the aforesaid, to be fully aware of the mass distributed on board, thus allowing automatable preliminary trimming of the aircraft.

In an equally advantageous embodiment of the equipment module, at least one passenger seat is arranged on the floor element and is attached to the attachment means. Preferably, the passenger seat comprises a seat belt means that makes it possible for a passenger to fasten a seat belt to the passenger seat. According to the invention the seat belt means may comprise a seat belt sensor device that can be connected to the electronics unit and that is adapted for transmitting a seat belt fastening status to the electronics unit. If the corresponding accommodation space of the vehicle is to be equipped with a row of passenger seats, and if during operation of the vehicle the wearing of seat belts is at least partly obligatory, respective automatic querying of the seat belt fastening status is possible.

In an advantageous embodiment, furthermore, the equipment module can comprise a container equipped with a temperature adjustment device. The aforementioned is equipped to carry out cooling and/or heating in order to provide a constant target temperature in the container. This can be necessary, in particular, for the transport of foodstuffs or plants. Controlling the temperature adjustment device can be carried out by means of a control unit that is provided with a specified target temperature, be it by way of an input means directly on the container, by means of transmission via an electronics unit of the equipment module, by way of a calculating unit of the vehicle, or the like. In order to be informed about the temperature, the container comprises a temperature sensor connected to the control unit. The control unit can be a self-contained control unit, or it can be integrated in the electronics unit of the equipment module or in a central calculating unit of the vehicle. Lighting means can be provided to provide light, in particular for transporting plants, which lighting means can be controlled centrally by way of a calculating unit of the vehicle or the electronics unit of the equipment module.

In an advantageous embodiment the equipment module can be designed as a galley module and can preferably comprise electrically operable food preparation equipment such as ovens, water heaters and the like, which are supplied with electricity by way of the first inductive coupling element.

In an advantageous embodiment of the invention the at least one vehicle space is designed as a cargo space whose clear ceiling height is not less than 1.80 m. Accordingly, a cargo space can be provided in the vehicle, which cargo space can not only be used for holding cargo or cargo containers, but can also accommodate equipment modules that are designed as passenger modules. With a clear ceiling height of at least 1.80 m with the equipment model slid in and locked, locomotion within the passenger cabin formed in this way can be made possible. In such a design it would be preferable for the clear ceiling height with the equipment module in its inserted state to be no less than 1.95 m.

In a preferred embodiment of the invention the floor area of the at least one vehicle space comprises a roller conveyor that makes possible the sliding-in of cargo containers and/or freight pallets. Preferably, the roller conveyor can also be driven so that placing the equipment module according to the invention onto an insertion section of a roller conveyor is sufficient to move the equipment module in the cargo space to the intended position.

In a further advantageous embodiment, the at least one retaining means of the at least one floor area is a grid of a plurality of retaining means. This allows to attach floor elements of different sizes and in different positions on the floor area. In this context it is further preferred that the dimensions of the floor element further correspond to the grid of the plurality of retaining means.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1A:
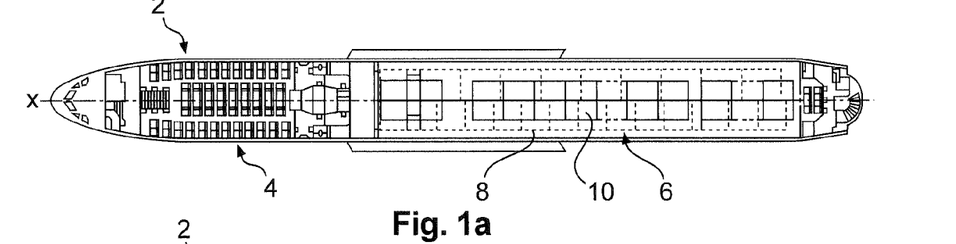
FIGS. 1a to 1d show an aircraft with a cargo space that can be equipped with equipment modules according to the invention.

FIG. 1a shows a section view of an aircraft fuselage 2 of an aircraft. The aircraft fuselage 2 comprises a front passenger region 4 and a cargo space 6 which in turn comprises a floor area 8 on which equipment modules according to various embodiments of the invention can be arranged. However, in the illustration of FIG. 1a only cargo containers are shown that completely fill the cargo space 6 while maintaining lateral corridors.

Figure 1B:
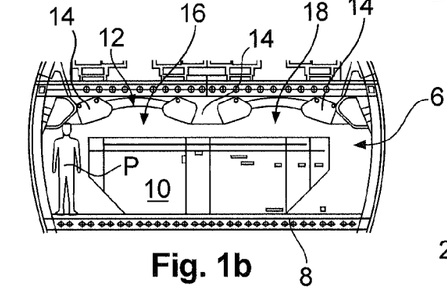

The illustration of FIG. 1b shows part of the cross-sectional profile of the aircraft fuselage 2 in which the useable height of the cargo space 6 is illustrated. At the top 12 of the cargo space 6 there is an arrangement of overhead stowage compartments 14 that include two regions 16 and 18 in which, instead of a stowage compartment 14, exclusively a ceiling lining element is arranged. Underneath these regions 16 and 18 there may be two aisles 17 and 19 that extend parallel to a longitudinal axis x of the aircraft. In this arrangement the clear ceiling height of the cargo space 6 is selected in such a manner that a passenger P is able to stand upright in the cargo space 6. A minimum height required for locomotion within the cargo space would be approximately 1.80 m, however, a minimum ceiling height of 1.95 m would be preferable.

As clearly shown in FIGS. 1a and 1b, the cargo space 6 can be used not only for transporting cargo containers 10, but with slight modification may also make it possible to accommodate passengers P on passenger seats 21. To this effect the floor 8 of the cargo space 6 comprises attachment means 23 in the form of seat rails or similar devices which comprise the equipment modules 20 according to an embodiment of the invention with passenger seats.

Figure 1C:
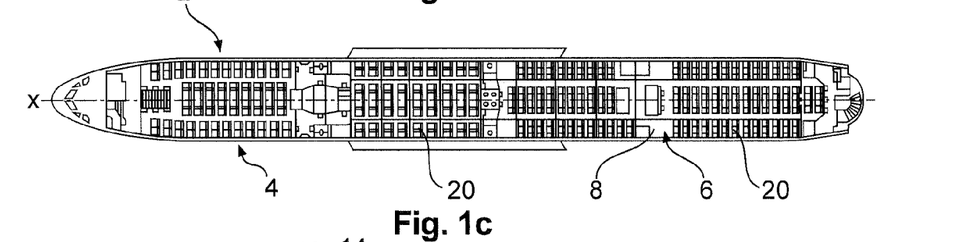
Figure 1D:
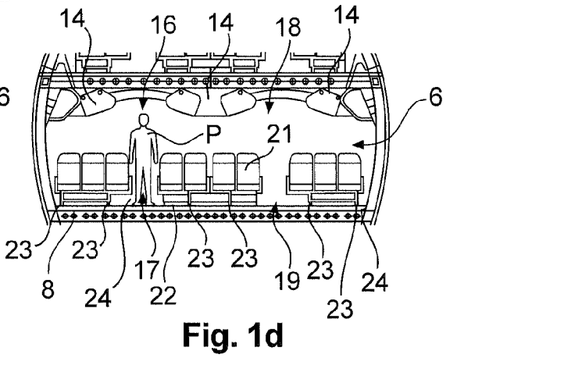

FIGS. 1c and 1d show an embodiment of the cargo space 6 as a passenger space, with the figures showing the same cargo space 6 as shown in the aircraft fuselage 2 in FIGS. 1a and 1b, except that equipment modules 20 according to an embodiment of the invention are arranged on its floor area 8. Said equipment modules 20 extend, for example, over the entire size of the cargo space 6 and are thus equipped to turn a pure cargo space design into a passenger cabin design. FIG. 1d shows that individual floor elements 22 and 24 are distributed on the floor 8 and comprise passenger seats 21.

Figure 2A:
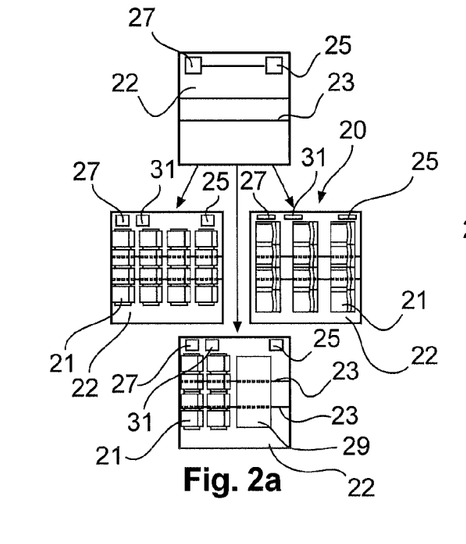
FIGS. 2a and 2b show different variants of equipment modules according to the invention.
Figure 2B:
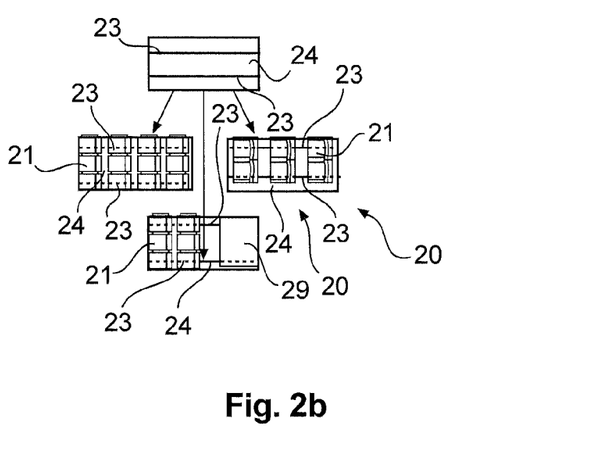

The floor elements 22 and 24 shown in FIGS. 2a and 2b are designed to be introduced through a corresponding opening in the vehicle space 6. In principle it is advantageous to use floor elements 22 or 24 that are as large as possible in order to create an equipment module according to the invention. However, if the particular aircraft fuselage 2 cannot provide a space opening of adequate size that makes it possible to insert relatively large floor areas 22, a division into smaller floor areas 24 would be imaginable and sensible. In addition, as shown in FIG. 1d, a combination of smaller floor elements 24 and larger floor elements 22 in a cargo space 6 can also be sensible.

On or at the floor elements 22 and 24, electronics units 25 are arranged that are connected to first inductive coupling elements 27 that can be positioned over second inductive coupling elements (not shown) in order to form a transducer for transmitting electrical power and data. If the equipment module 20 in question comprises elements that can be electrically operated, for example playback devices for in-flight entertainment systems on passenger seats 21, cooling or heating devices on galley elements 29 or the like, a distributor unit 31 is sensible that provides the electrical power with preset characteristics, i.e. voltage, waveform, frequency etc., from the inductive coupling elements 27 to a multitude of consumers.

As the examples shown in FIGS. 2a and 2b suggest, there is practically no limit to the implementation of creative measures. This relates, for example, also to the provision of galley modules, toilet modules or other necessary items of equipment.

Figure 3A:
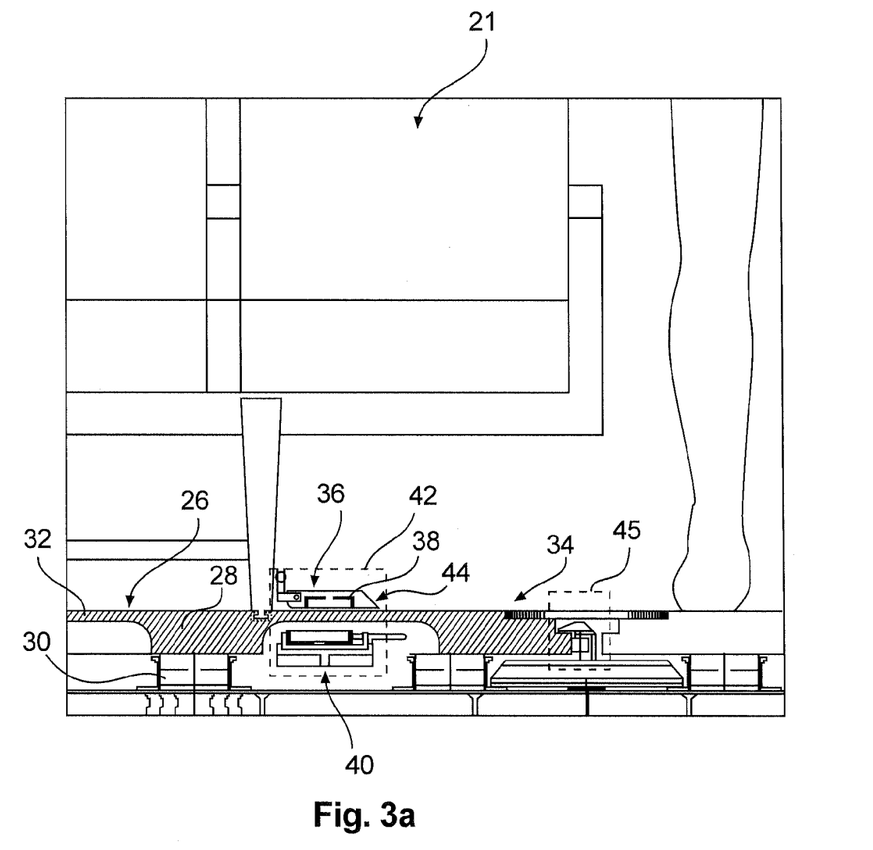
FIGS. 3a and 3b show an equipment module according to the invention, arranged on a floor of a vehicle space, as well as suitable retaining means.

FIG. 3a shows a floor element 26 that essentially comprises stiffening elements 28 as carriers for guide means 30, for example rollers of a roller conveyor, and a floor panel 32 attached thereto or forming an integral unit with the stiffening elements 28. At the top 34 of the floor element 26 a first inductive coupling element 36 is arranged, which comprises a coil 38 with a core that is arranged in close proximity to a second inductive coupling element 40 that is situated on the floor of the cargo space 6 and is separated from the first inductive coupling element 36 only by the floor panel 32 and a short air gap. As a result of this adjacent arrangement a transducer 42 is formed that is designed for transmitting electrical alternating voltage signals. By inducing an alternating voltage with an oscillation signal modulated thereon, it becomes possible in addition to transmitting purely electrical power to also transmit data that by means of an electronics unit 44, which is, for example, arranged in a shared housing together with the first inductive coupling element 36, are converted from analog alternating voltage signals to digital signals.

The first inductive coupling element 36 comprises a connection to the electronics unit 44, which is furthermore designed to emit data relating to the type of the particular equipment module according to an embodiment of the invention by way of the first inductive coupling element 36 to the second inductive coupling element 40 so that the aircraft can become aware of the equipment state of the equipment module according to an embodiment of the invention. Apart from the type of equipment module, the equipment state can also comprise its weight, power consumption and the like. If the equipment module is to be temperature-controlled, the data transmitted can also include a temperature.

Figure 3B:
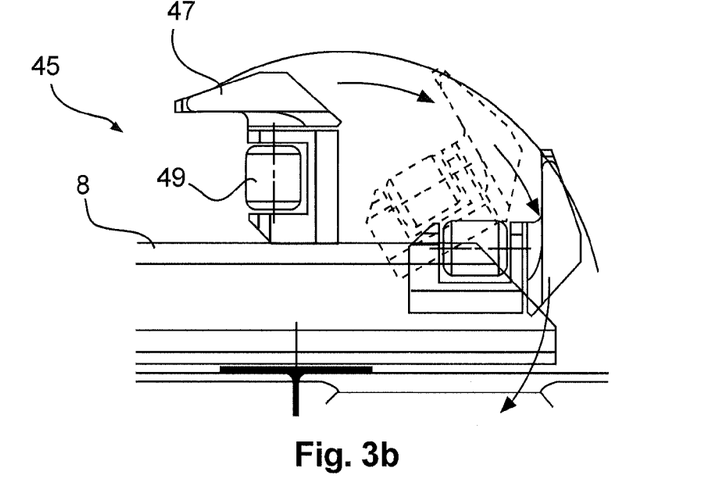
Figure 4A:
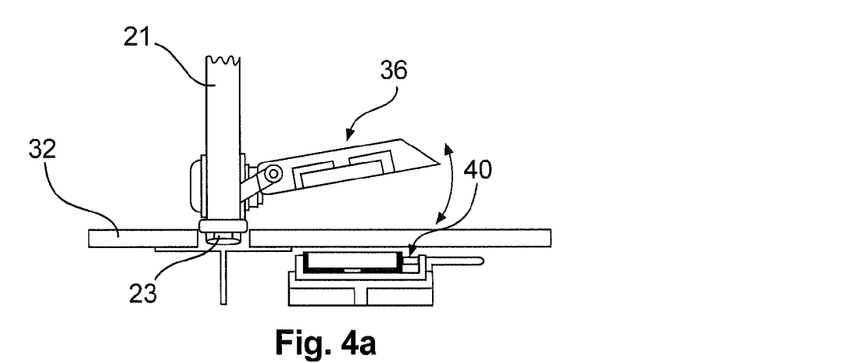
FIGS. 4a to 4d show corresponding inductive coupling elements of an equipment module according to the invention in a vehicle space.
Figure 4B:
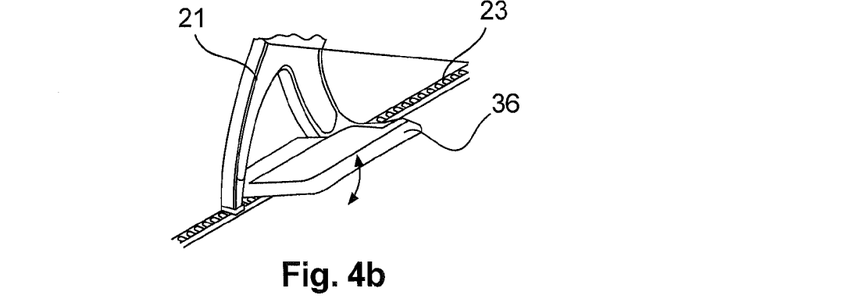
Figure 4C:
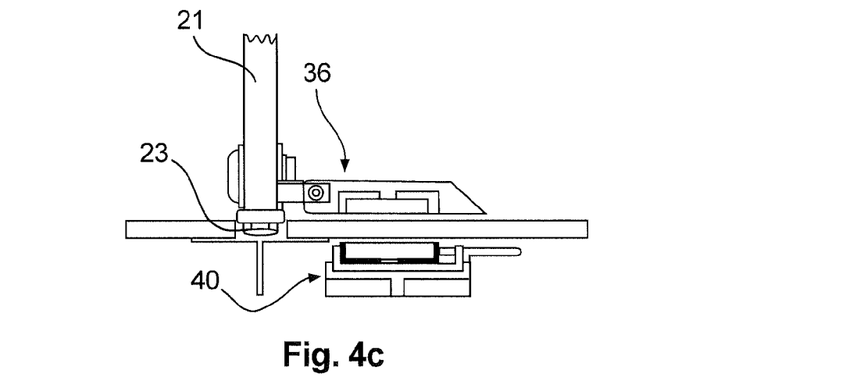
Figure 4D:
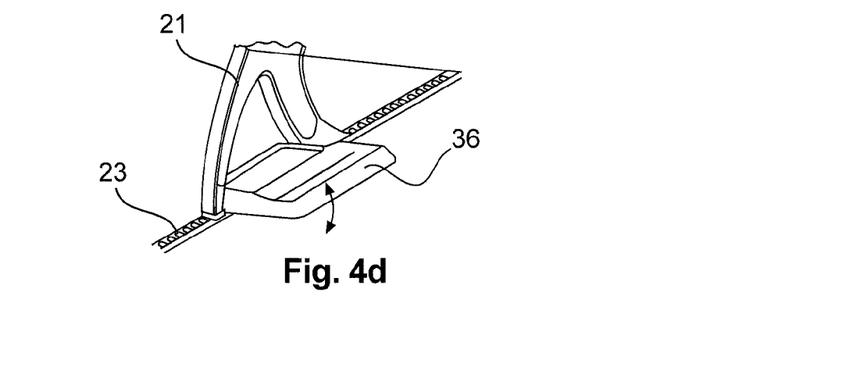

An equipment module moved into the cargo space 6 is equipped, by way of a pivotally held retaining means 45, with a roller 49 and a hook-shaped projection 47 that is arranged so as to be largely perpendicular to it, wherein the retaining means 45 is held on a structurally-fixed part of the cargo space 6. With an arrangement in a position in which the roller is situated so as to be parallel to the floor area 8, displacement of an equipment module along its hook-shaped projection 47 can be carried out. This means that the projection 47 also serves as a guide means or travel limitation means. By pivoting the retaining means 45 to a position in which the roller 49 is arranged so as to be largely perpendicular to the floor area 8, the projection 47 engages the floor element 26 over an area. For secure holding of the floor element 26 such retaining means 45 are arranged on all the edges of the floor element 26. Preferably, the retaining means 45 is designed in such a manner that it can in an uncomplicated manner be undone again with the push of a button, a knurled screw, an unlocking tool or the like.

In order to reduce the necessary number of second inductive coupling elements 40 that need to be located at the bottom of the cargo space 6, first inductive coupling elements can be used on the equipment modules according to an embodiment of the invention, which first inductive coupling elements 36 extend over a longer distance than the second inductive coupling elements 40 situated on the floor. FIGS. 4a to 4d show such an embodiment in which the first inductive coupling element 36, which is situated on the equipment module according to an embodiment of the invention, comprises an elongated shape that in addition is held in a fold-down manner on a passenger seat 21 so that the likelihood of damage occurring during the integration of the equipment module according to the invention can be reduced by folding down the inductive coupling element 36 according to the invention.

Since no connectors and cables are used, quick reconfiguration of the aircraft in operation is possible. There is no need to provide cutouts for feeding-through cables, connectors, mounts or the like in floor panels and sidewalls and in floor coverings. Servicing costs can be reduced, as can downtimes or reconfiguration times. Furthermore, it should be pointed out that the equipment modules according to the invention are not limited to the reconfiguration of a cabin; instead, they can also be used for equipment in new aircraft.

Figure 5:
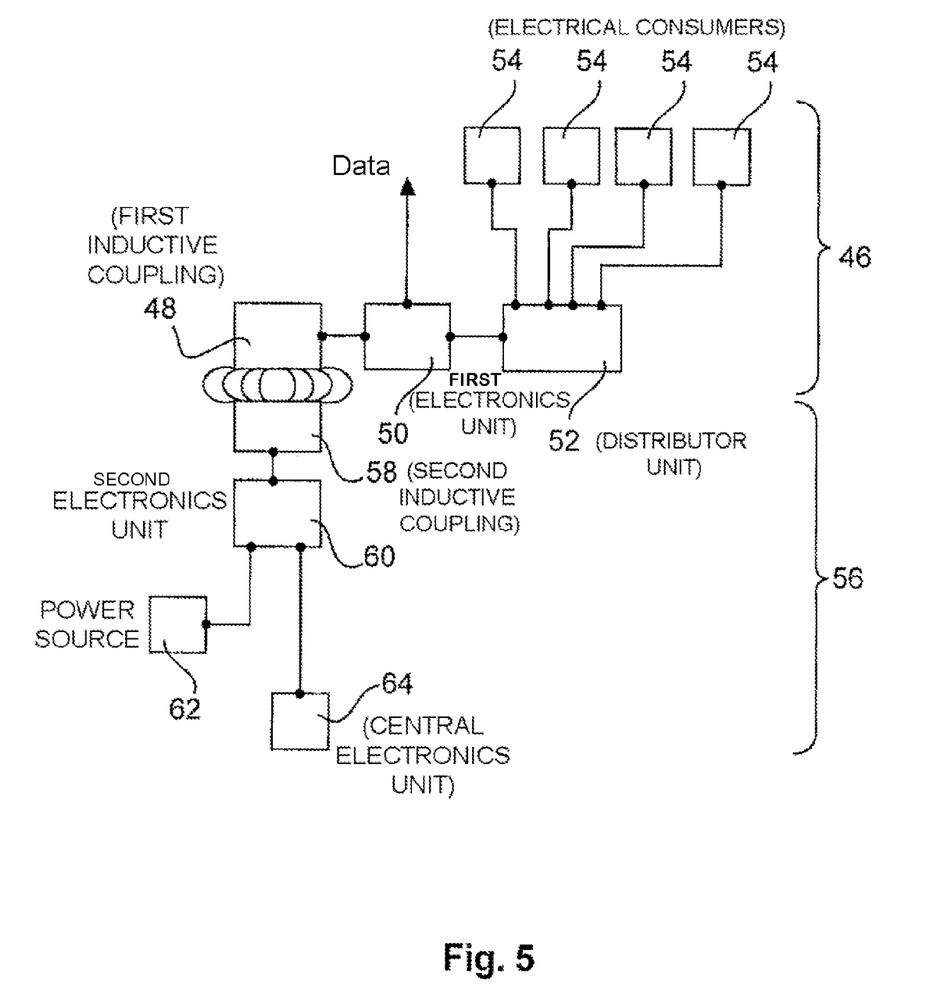
FIG. 5 shows essential and optional effective components.

FIG. 5 shows a block-based diagrammatic view of essential and optional components. On an equipment module side 46 a first inductive coupling element 48 is arranged that is connected to a first electronics unit 50 designed to transmit data by way of the first inductive coupling element 48. At the same time by coupling the first inductive coupling element 48 to a distributor unit 52, electrical power can be supplied to various electrical consumers 54, wherein the distributor unit 52 is adapted for providing a suitable voltage at a suitable frequency.

On a system side 56 a second inductive coupling element 58 is arranged that is also connected to a second electronics unit 60. The latter is communicating with a source of electrical power 62 which by leading an alternating voltage to the second inductive coupling element 58 makes it possible to transmit electrical power to the first inductive coupling element 48. Furthermore, a central electronics unit 64 is connected to the second electronics unit 60 which is, for example, designed as an on-board computer that from data from the equipment modules can, for example, determine the position of the center of gravity of the aircraft.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Aircraft fuselage
4 Passenger region
6 Cargo space
8 Floor area
10 Cargo container
12 Top
14 Overhead stowage compartments
16 Region with ceiling lining elements
17 Aisle
18 Region with ceiling lining elements
19 Aisle
20 Equipment module
21 Passenger seat
22 Floor element
23 Attachment means
24 Floor element
25 Electronics unit
26 Floor element
27 First inductive coupling element
28 Stiffening element
29 Galley element
30 Guide means
31 Distributor unit
32 Floor panel
34 Top
36 First inductive coupling element
38 Coil
40 Second inductive coupling element
42 Transducer
44 Electronics unit
45 Retaining means
46 Equipment module side
47 Hook-shaped projection
48 First inductive coupling element
49 Roller
50 First Electronics unit
52 Distributor unit
54 Electrical consumer
56 System side
58 Second inductive coupling element
60 Second Electronics unit
62 Source of electrical power
64 Central electronics unit
P Passenger

The invention claimed is:

1. A vehicle, comprising:
a vehicle body;
at least one equipment module having a floor element, at least one first inductive coupling element, and at least one first electronics unit;
wherein the floor element comprises at least one attachment means, which is accessible from the top for attaching at least one Item of equipment to the floor element, and
wherein the first inductive coupling element is arranged on the floor element and is connected to the at least one first electronics unit, and
at least one vehicle space arranged in the vehicle body, having:
at least one floor area at least one retaining means arranged on the floor area for attaching the at least one equipment module on the at least one floor area; and
a grid of a plurality of second inductive coupling elements, wherein the second inductive coupling elements are connected to at least one second electronics unit of the vehicle, and
wherein the at least one first electronics unit of the at least one equipment module is configured for providing an identification signal by way of the first inductive coupling element, which identification signal makes it possible to identify the equipment module.

2. The vehicle of claim 1, wherein the first inductive coupling element is arranged at the top of the floor element, and wherein the position of the first inductive coupling element is in or beside a region situated above the at least one attachment means.

3. The vehicle of claim 1, wherein the equipment module further comprises a distributor unit connected to the first inductive coupling element and configured for adjusting a voltage induced into the first inductive coupling element to at least one of a predetermined voltage value and a predetermined frequency and to provide the said voltage on at least one voltage output.

4. The vehicle of claim 3, wherein the distributor unit is configured for extracting an oscillation signal from a voltage induced into the first inductive coupling element, and to provide the oscillation signal, by way of a signal converter, as binary data to at least one data interface.

5. The vehicle of claim 3, wherein at least one of the distributor unit and the first electronics unit of the equipment module is configured for modulating data arriving at the data interface to form an oscillation signal that can be transmitted by way of the first inductive coupling element for the provision or transmission of data to correspondingly-positioned second inductive coupling elements.

6. The vehicle of claim 1, wherein the first inductive coupling element is integrated directly into a floor panel of the floor element.

7. The vehicle of claim 1, wherein the first electronics unit of the equipment module is equipped to send out weight data.

8. The vehicle of claim 1, wherein the equipment module further comprises at least one passenger seat.

9. The vehicle of claim 8, wherein the equipment module further comprises at least one seat belt sensor device for detecting a fastening status of a seat belt means, wherein the first electronics unit of the equipment module is equipped to send out the fastening status.

10. The vehicle of claim 1, wherein the at least one vehicle space comprises at least one vehicle space opening through which an equipment module is slidable onto the floor area of the vehicle space for attaching to the at least one retaining means.

11. The vehicle of claim 1, wherein the at least one vehicle space is configured as a cargo space whose clear ceiling height is not less than 1.80 m.

12. The vehicle of claim 1, wherein the floor area of the at least one vehicle space comprises a roller conveyor for at least one of a sliding-in cargo container and a freight pallet.

13. The vehicle of claim 1, wherein the at least one retaining means of the at least one floor area is a grid of a plurality of retaining means.

14. The vehicle of claim 13, wherein the dimensions of the floor element further correspond to the grid of the plurality of retaining means.

15. The vehicle of claim 1, wherein the vehicle is an aircraft.

* * * * *